United States Patent
Kreiner et al.

(10) Patent No.: US 7,505,673 B2
(45) Date of Patent: Mar. 17, 2009

(54) VIDEO RECORDER FOR DETECTION OF OCCURRENCES

(75) Inventors: Barrett Morris Kreiner, Norcross, GA (US); Joseph E. Page, Jr., Suwanee, GA (US)

(73) Assignee: AT&T Intellectual Property I, L.P., Bedminster, NJ (US)

( * ) Notice: Subject to any disclaimer, the term of this patent is extended or adjusted under 35 U.S.C. 154(b) by 865 days.

(21) Appl. No.: 10/674,840

(22) Filed: Sep. 30, 2003

(65) Prior Publication Data

US 2005/0068429 A1 Mar. 31, 2005

(51) Int. Cl.
- *H04N 5/91* (2006.01)
- *H04N 7/00* (2006.01)
- H04N 5/94 (2006.01)
- H04N 5/93 (2006.01)
- G11B 27/00 (2006.01)

(52) U.S. Cl. .............................. 386/95; 386/49; 386/64; 386/104

(58) Field of Classification Search .................. 386/49, 386/64, 95, 104
See application file for complete search history.

(56) References Cited

U.S. PATENT DOCUMENTS

| | | | |
|---|---|---|---|
| 5,144,661 A | 9/1992 | Shamosh et al. | |
| 5,301,240 A * | 4/1994 | Stockum et al. | 382/100 |
| 5,402,167 A | 3/1995 | Einbinder | |
| 5,432,871 A | 7/1995 | Novik | |
| 5,724,475 A | 3/1998 | Kirsten | |
| 6,167,186 A | 12/2000 | Kawasaki | |
| 6,272,253 B1 | 8/2001 | Bannon | |
| 6,330,025 B1 | 12/2001 | Arazi | |
| 6,356,664 B1 | 3/2002 | Dunn | |
| 6,393,163 B1 | 5/2002 | Burt | |
| 6,456,321 B1 | 9/2002 | Ito | |
| 6,496,607 B1 * | 12/2002 | Krishnamurthy et al. | 382/282 |
| 6,538,623 B1 | 3/2003 | Parnian et al. | |
| 6,763,071 B1 | 7/2004 | Maeda et al. | |
| 6,785,905 B1 * | 8/2004 | Nishioka et al. | 725/110 |
| 7,081,817 B2 * | 7/2006 | Zhevelev et al. | 340/567 |
| 2002/0064314 A1 | 5/2002 | Comaniciu | |
| 2002/0069317 A1 * | 6/2002 | Chow et al. | 711/104 |
| 2002/0163577 A1 | 11/2002 | Myers | |
| 2002/0191952 A1 * | 12/2002 | Fiore et al. | 386/46 |

(Continued)

OTHER PUBLICATIONS

U.S. Official Action dated Feb. 9, 2007 in U.S. Appl. No. 10/674,770.

(Continued)

*Primary Examiner*—Thai Tran
*Assistant Examiner*—Daquan Zhao
(74) *Attorney, Agent, or Firm*—Hope Baldauff Hartman, LLC

(57) ABSTRACT

A video recorder is disclosed for recording audio and video data of an event. The video recorder includes a processor communicating with memory. The memory stores audio and/or video data of an event. The video data includes a series of picture frames. A set of rules is also stored in the memory. The set of rules specifies either i) multiple regions of interest and/or ii) multiple regions of disinterest within a single picture frame. The set of rules dynamically varies a bitrate of the audio/video data associated with each region of interest and with each region of disinterest. The audio/video data is stored in the memory according to the bitrate specified by the set of rules.

20 Claims, 3 Drawing Sheets

U.S. PATENT DOCUMENTS

| | | |
|---|---|---|
| 2003/0058341 A1* | 3/2003 | Brodsky et al. .............. 348/169 |
| 2003/0109972 A1 | 6/2003 | Tak |
| 2003/0154009 A1* | 8/2003 | Basir et al. .................... 701/35 |
| 2005/0021197 A1 | 1/2005 | Zimmerman et al. |

OTHER PUBLICATIONS

U.S. Official Action dated Jul. 27, 2007 in U.S. Appl. No. 10/674,770.

U.S. Official Action dated Jan. 28, 2008 in U.S. Appl. No. 10/674,770.

U.S. Official Action dated Jun. 15, 2007 in U.S. Appl. No. 10/674,995.

U.S. Official Action dated Nov. 1, 2007 in U.S. Appl. No. 10/674,995.

U.S. Official Action dated Apr. 17, 2008 in U.S. Appl. No. 10/674,995.

U.S. Official Action dated Jun. 26, 2008 in U.S. Appl. No. 10/674,770.

U.S. Official Action dated Oct. 16, 2008 in U.S. Appl. No. 10/674,995.

U.S. Official Action dated Dec. 24, 2008 in U.S. Appl. No. 10/674,770.

* cited by examiner

VIDEO RECORDER FOR DETECTION OF OCCURRENCES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATIONS

This patent application relates to the co-pending and commonly-assigned U.S. application Ser. No. 10/674,995, filed Sep. 30, 2003, and entitled "Video Recorder," of which the "Brief Summary Of The Invention" section and the "Detailed Description of the Invention" section are incorporated herein by reference.

This patent application also relates to the and commonly-assigned U.S. application Ser. No. 10/674,770, filed Sep. 30, 2003, and entitled "Video Recorder," of which the "Brief Summary Of The Invention" section and the "Detailed Description of the Invention" section are incorporated herein by reference.

BACKGROUND OF THE INVENTION

1. Field of the Invention

This invention generally relates to image analysis and, more particularly, to image compression using adaptive coding.

2. Description of the Related Art

Prior art video security systems are not always effective. Whether the prior art video security system utilizes older, analog video cassette tapes, or more recent digital technologies, often times these prior art security systems do not capture important images that help resolve security situations. The older, analog video cassette-based systems, for example, produce hours of usually unimportant video. If a security situation arises, time and resources are squandered while the video tapes are manually reviewed for important information (e.g., the identity of a thief). Even the newer, digital surveillance technologies, using computer intelligence to isolate "important events," often fail to capture information that can resolve security situations. By the time the computer intelligence has determined that something "important" is occurring, revealing information (such as the thief's face) has not been saved. There is, accordingly, a need in the art to capture video/audio data for improved surveillance needs, a need for producing surveillance data that does not require a large amount of time for manual review, and a need for improved recording of video and/or audio data that is compatible with digital technologies.

BRIEF SUMMARY OF THE INVENTION

The aforementioned problems, and other problems, are reduced by a video recorder. This invention provides methods, apparatuses, computer programs, and computer program products for digitally recording video and/or audio data of an event. This invention provides digital storage of visual and aural data for improved quality and for simplified manipulation. Because this invention provides digital storage, the video and/or audio data may be formatted and presented on many different hardware and software systems (e.g., computers, personal digital assistants, cell phones, tablets, and other communications devices). The digital nature of the data may also be communicated in real-time, or near real-time, to monitoring agencies, law enforcement agencies/authorities, and other entities. This invention thus provides a simple, convenient, and effective means of storing and of communicating video and audio data.

The video recorder of this invention can record "backwards in time." That is, this invention provides time-delayed video and audio data. The video recorder stores video and audio data in a loop buffer. The loop buffer stores video and audio data for a predetermined duration or elapse of time. Because the loop buffer stores anywhere from a few seconds to several minutes of video data, the loop buffer, at any one time, provides data from a time recently preceding the recorded event. The loop buffer thus provides both real-time and time-delayed video and audio data of the event captured by the camera. As this patent will further explain, this "time-delayed" video and audio data may be very useful for security and surveillance uses.

This invention discloses methods and apparatuses for recording video data of an event. Some of the apparatuses include a video recorder. The video recorder includes a processor communicating with memory. The memory stores audio and/or video data of an event. The video data includes a series of picture frames. A set of rules is also stored in the memory. The set of rules specifies either i) multiple regions of interest and/or ii) multiple regions of disinterest within a single picture frame. The set of rules dynamically varies a bitrate of the audio/video data associated with each region of interest and with each region of disinterest. The audio/video data is stored in the memory according to the bitrate specified by the set of rules.

Other embodiments of this invention describe another video recorder. The video recorder includes a processor communicating with memory, and the memory stores audio data and/or video data of an event. The video data includes a series of picture frames. A loop buffer also stores the audio data and/or the video data of the event, and the loop buffer also stores time-delayed audio data and/or time-delayed video data that precedes the event. A set of rules is also stored in the memory. The set of rules specifies i) multiple regions of interest within a single picture frame, ii) multiple regions of disinterest within the single picture frame, and/or iii) when to transfer the contents of the loop buffer into the memory. The set of rules dynamically varies a bitrate of either the audio data and/or video data associated with each region of interest, associated with each region of disinterest, and associated with the contents of the loop buffer. The video recorder provides both real-time and time-delayed audio data and video data of the event.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
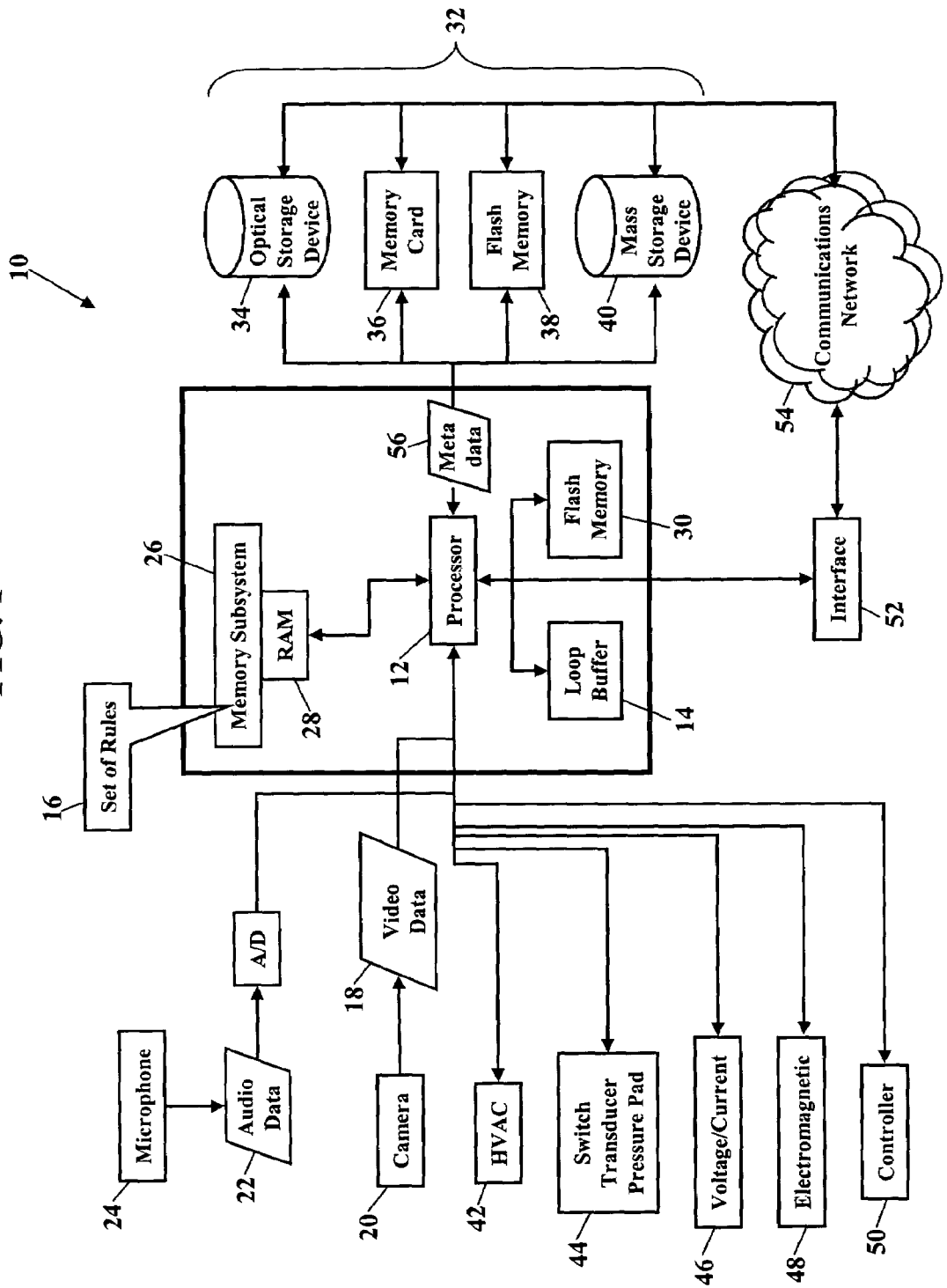
FIG. 1 is a schematic illustrating a video recorder according to embodiments of this invention.

FIG. 1 is a schematic illustrating a video recorder 10 according to embodiments of this invention. This invention provides methods, apparatuses, computer programs, and computer program products for recording video and/or audio data of an event. This invention provides digital storage of visual and aural data for improved quality and for simplified manipulation. Because this invention provides digital storage, the video and/or audio data may be formatted and presented on many different hardware and software systems (e.g., computers, personal digital assistants, cell phones, tablets, and other communications devices). The digital nature of the data may also be communicated in near real time to monitoring agencies, law enforcement agencies/authorities, and other entities. This invention thus provides a simple, convenient, and effective means of storing and of communicating video and audio data.

The video recorder 10 of this invention also provides time-delayed video and audio data. The video recorder 10 stores video and audio data in a loop buffer 14. The loop buffer 14 stores video and audio data for a predetermined duration or elapse of time. Because the loop buffer 14 stores anywhere from a few seconds to several minutes of video data, the loop buffer 14, at any one time, provides data from a time recently preceding the recorded event. The loop buffer 14 thus provides both real-time and time-delayed video and audio data of the event captured by a camera/microphone. As this patent will further explain, this "time-delayed" video and audio data may be very useful for security and surveillance uses.

Those of ordinary skill in the art of computer programming will recognize computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a simplified componentry schematic of the video recorder 10. The video recorder 10 includes at least one processor 12, a loop buffer 14, and a set 16 of rules. The video recorder 10 stores video data 18 of an event captured by at least one camera 20. The video data 18 includes a series of picture frames. When this series of picture frames is sequentially reviewed, the video data 18 resembles a motion picture of the event. The video recorder 10 may also store audio data 22 from a microphone 24. The term "microphone" includes any means for transferring sound/pressure into electrical signals.

The video recorder stores the video data 18 and the audio data 22 in one or more memory devices. The memory devices include a memory subsystem 26 (such as RAM memory 28), flash memory 30, and/or a peripheral storage device 32. The peripheral storage device 32 could include an optical storage device 34, a memory card 36, a removable flash memory storage device 38, or a mass-storage device 40. The peripheral storage device 32 could also include a magnetic storage device (not shown) for storing the video data of the event. As the at least one camera 20 captures and sends video data 18 of the event, the video recorder 10 stores the frames of the video data 18 in one or more of the memory devices. The video recorder 10, likewise, stores the audio data 22 from the microphone 24 in one or more of the memory devices.

The video recorder 10 also includes the loop buffer 14. The loop buffer 14 also stores the video data 18 and the audio data 22 of the event. The loop buffer 14, however, provides time-delayed video and audio data of the event. As those of ordinary skill in the art understand, the loop buffer 14 stores the video data 18 and the audio data 22 for a predetermined duration or elapse of time (typically from a few seconds to several minutes). The video data 18 and the audio data 22 are stored in a plurality of data registers. These data registers are coupled in series, such that an output of the first register is coupled to an input of the next register in the series. The video data 18 and the audio data 22 thus shuttles from one register to the next register, thus providing time to execute logical instructions concerning the video data. When the video data 18 and the audio data 22 reaches the last register in the series, the data must either be saved/transferred to a more permanent memory device, or the data must be discarded. Because the loop buffer 14 stores anywhere from a few seconds to several minutes of data, the loop buffer 14 provides audio and video data from a time recently preceding the recorded event. As this patent will further explain, this "time-delayed" audio and video data may be very useful for security and surveillance uses. Because, however, the operational and architectural concepts of loop buffers are known, this patent will not further describe the loop buffer 14. If the reader desires a more detailed explanation of loop buffers, the reader is invited to consult U.S. Pat. No. 6,598,155 to Ganapathy et al. (Jul. 22, 2003), of which the "Detailed Description of the Preferred Embodiment" section is incorporated herein by reference.

The video recorder 10 also includes the set 16 of rules. The set 16 of rules operates with the at least one processor 12 to create a "rules engine." The set 16 of rules determines when to transfer the contents of the loop buffer 14 into one or more of the memory devices. The set 16 of rules are logical rules, and each rule describes an event, occurrence, or detection that causes the contents of the loop buffer 14 to be transferred into one or more of the memory devices. The set 16 of rules is shown residing in the memory subsystem 26. The set 16 of rules, however, could also additionally or alternatively reside in the flash memory 30 and/or any of the peripheral storage devices 32 (e.g., the optical storage device 34, the memory card 36, the removable flash memory storage device 38, and/or the mass-storage device 40). When the set 16 of rules determines to transfer the contents of the loop buffer 14 into one or more of the memory devices, the memory devices then store time-delayed audio and video data. This time-delayed audio and video data precedes the event, occurrence, or detection that triggered the transfer. The contents of the loop buffer 14 thus contain audio and/or video data that precedes the event, occurrence, or detection.

The video recorder 10 may interface with other means for sensing the event to be recorded. The video recorder 10, for example, could interface with a Heating, Ventilation, and Air Conditioning (HVAC) system 42. The set 16 of rules could define HVAC conditions that activate the video recorder 10 and/or that transfer the contents of the loop buffer 14 into one or more of the memory devices. The video recorder 10 could also interface with a switch, a transducer, or a pressure pad (shown collectively as reference numeral 44). The set 16 of rules could specify what opened and/or closed positions of the switch that activate the video recorder 10 and/or that transfer the contents of the loop buffer 14. The set 16 of rules could also specify voltage/current conditions of the transducer and/or of the pressure pad that activate the video recorder 10 and/or that transfer the contents of the loop buffer 14. The video recorder 10 could also interface with a voltage/current detector 46 and an electromagnetic sensor 48. The set 16 of rules could specify voltage/current conditions measured by the voltage/current detector 46 that activate the video recorder 10 and/or that transfer the contents of the loop buffer 14. The set 16 of rules, similarly, could specify frequencies (e.g., infrared, RF, or radioactive) detected by the electromagnetic sensor 48 that activate the video recorder 10 and/or that transfer the contents of the loop buffer 14. The video recorder 10 could also interface with a controller/computer 50 that instructs the video recorder 10 to operate. The video recorder 10 could also interface with a temperature sensor (such as high heat or fire), a water sensor, a smell/scent sensor (such as liquid propane or liquid natural gas), and/or a sensor for detecting sounds. The video recorder 10 interfaces with these means for sensing the event and initiates the video data 18 and/or the audio data 22 of the event.

The video recorder 10 may also include an interface 52 to a communications network 54. This interface 52 allows the video recorder 10 to transfer the contents of the memory devices, and/or the loop buffer 14, to a remote location. The interface 52 could include a physical connection (e.g., a wire, optical fiber, or cable connection) to the communications network 54. The interface 52, however, may also utilize a wireless protocol to a wireless communications network. Wireless networks, such as those utilizing the I.E.E.E. 802 family of wireless standards, could be used to transfer the contents of the loop buffer 14 to one or more remote memory locations. The interface 52 may also utilize any portion of the electromagnetic spectrum, and the interface 52 may utilize any signaling standard or method. The video recorder 10, for example, could transfer the contents of the loop buffer 14 to any of the peripheral storage devices 32 (e.g., the optical storage device 34, the memory card 36, the removable flash memory storage device 38, and/or the mass-storage device 40) via the wireless interface 52 to the communications network 54. When the video recorder 10 comes within range of a wireless network (e.g., a "Wi-Fi" network), the set 16 of rules could specify that the contents of the loop buffer 14 be wirelessly transferred to any of the peripheral storage devices 32. The set 16 of rules could also specify the conditions at which the video data 18 and/or the audio data 22 are communicated via the communications network 54 to a remote location or entity (e.g., a monitoring agency).

The video recorder 10 may also utilize metadata 56. The term "metadata" describes any data, description, narration, or explanation of other data. Here the set 16 of rules may add, append, supplement, or tag the video data 18 and/or the audio data 22 with the metadata 56. The metadata 56 may be any information, such as a description of a rule that caused the contents of the loop buffer 14 to be transferred to at least one of the memory devices. The metadata 56 may also include audio/textual narration that further describes the video data 18 and/or the audio data 22.

Figure 2:
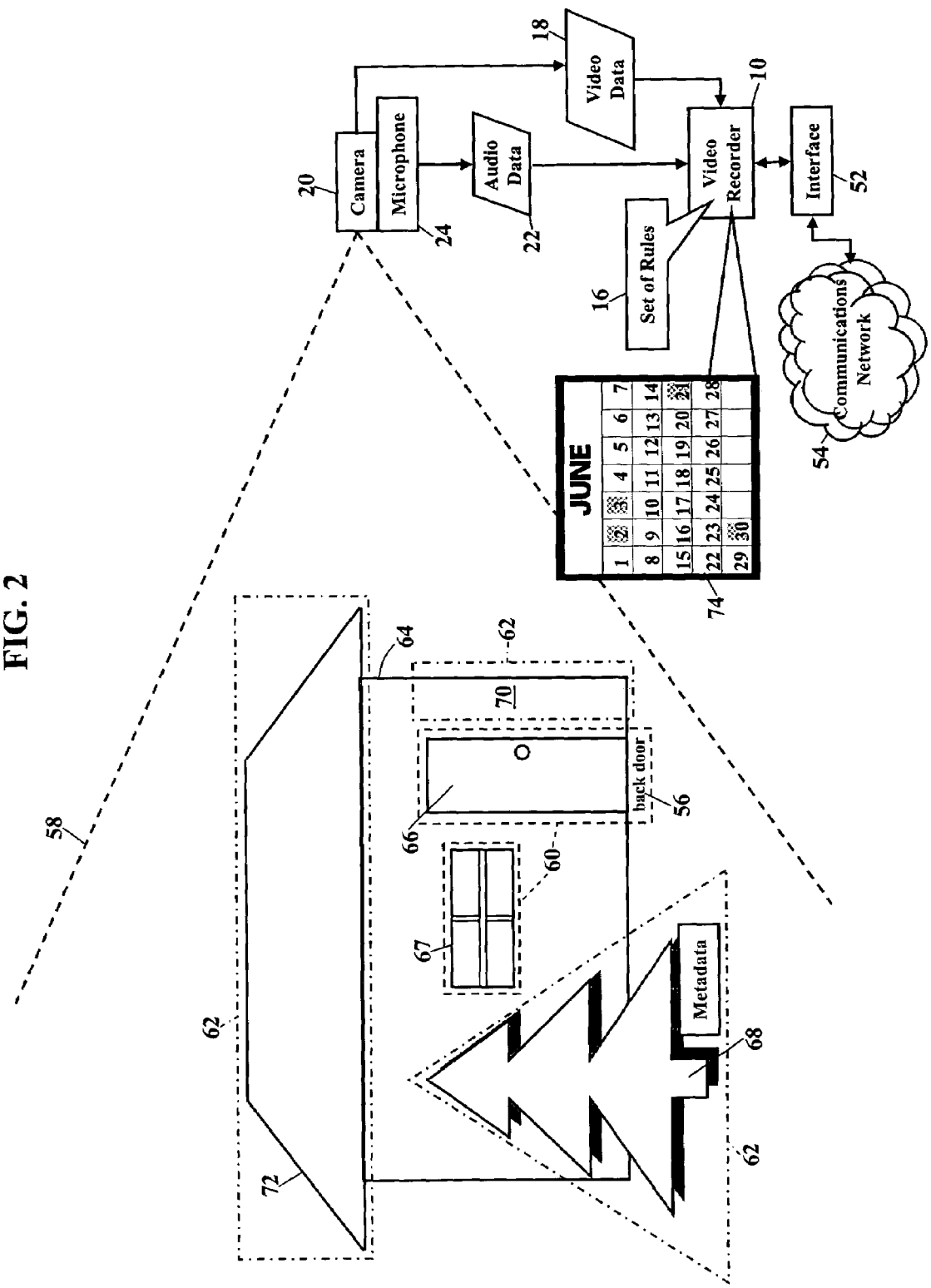
FIG. 2 is a schematic illustrating more embodiments of this invention.

FIG. 2 is a schematic illustrating more embodiments of this invention. FIG. 2 shows a single frame 58 captured by the at least one camera 20. The single frame 58 represents the field of view of the camera 20. The video recorder 10, as mentioned earlier, stores the video data 18 of the event captured by the at least one camera 20. The video data 18 includes the single frame 58, and the single frame 58 is one in a series of picture frames. When this series of picture frames is sequentially reviewed, the video data 18 resembles a motion picture of the event captured by the camera 20. The video recorder 10 also stores the audio data 22 produced by the microphone 24.

As FIG. 2 shows, this invention allows a user to specify regions and bitrates within the single frame 58. That is, the user may configure the set 16 of rules to define a region 60 of interest, and a region 62 of disinterest, within the single frame 58 captured by the camera 20. The user may also configure the set 16 of rules to specify a bitrate encoding that is associated with each region 60 of interest, and with each region 62 of disinterest, within the single frame 58. When the video recorder 10 detects motion within the single frame 58 (e.g., within the field of view of the camera 20), the video recorder 10 determines what region in which that motion occurred. The video recorder 10 then consults the set 16 of rules to determine the bitrate encoding for that region. If, for example, the movement occurs within the region 60 of interest, the set 16 of rules may specify a higher bitrate encoding. The video recorder 10 then stores the video data 18 and/or the audio data 22 at the higher bitrate. The video recorder 10 could also transfer the contents of the loop buffer 14 into one or more of the memory devices at the higher bitrate. Because the video recorder 10 has the ability to record at higher bitrates for the region 60 of interest, the video data 18 and/or the audio data 22 has a higher resolution.

The video recorder 10 also stores at lower bitrates. When the video recorder 10 detects motion within the region 62 of disinterest, the set 16 of rules may specify a lower bitrate encoding. The video recorder 10 would then store the video data 18 and/or the audio data 22 at the lower bitrate. The video recorder 10 may also transfer the contents of the loop buffer 14 into one or more of the memory devices at the lower bitrate. Because the movement occurred within the region 62 of disinterest, the video data 18 and/or the audio data 22 are most likely "uninteresting." The video recorder 10 of this invention, then, reduces memory consumption for "uninteresting" events.

FIG. 2 illustrates an example having multiple regions 60 of interest and multiple regions 62 of disinterest within the single frame 58. The at least one camera 20 has within its field of view a building 64, a door 66, and a tree 68. The vicinity of the door 66 is most likely "interesting," so the user/administrator may define the set 16 of rules to specify the region 60 of interest to encompass the vicinity of the door 66. A window 67 is also "interesting," so the set 16 of rules may specify another region 60 of interest to encompass the window 67. The surrounding wall 70 of the building 64 may be "uninteresting," so the user/administrator may define the set 16 of rules to specify the surrounding wall 70 as a region 62 of disinterest. The roof 72 of the building 64, likewise, may be "uninteresting," so the set 16 of rules may specify the roof 72 as another region 62 of disinterest. The tree 68 is often problematic, as wind blowing through the tree 68 creates motion. The tree 68, then, is also defined as another region 62 of disinterest. The user/administrator may also specify the bitrate encoding for each region 60 of interest and for each region 62 of disinterest. The video recorder 10, then, specifies a lower bitrate for "uninteresting" events to prevent the video recorder 10 from consuming memory to record motion in the tree.

The video recorder 10 may also utilize the metadata 56. Each region 60 of interest and each region 62 of disinterest may be tagged with the metadata 56. The user/administrator, for example, may specify that the region 60 of interest, encompassing the vicinity of the door 66, be tagged "the back door." The region 60 of interest, similarly, may additionally or alternatively be tagged with a description of a rule that caused the video recorder 10 to store the video data 18 and/or the audio data 22 describing the door 66. The metadata 56 could be used to define objects within the regions, such as "sidewalk," "window," "water meter," or "manhole cover." The metadata 56 could be used to index the video data 18 and/or the audio data 22 for quicker retrieval. The user/administrator may also define the tolerance for motion detection within the region 60 of interest (e.g., the door 66) to be lower than the regions 62 of disinterest (e.g., the tree 68, the surrounding wall 70, and the roof 72).

The video recorder 10 may also utilize a calendar 74. The set 16 of rules may be modified according to particular times and dates. During work hours, for example, the set 16 of rules may be suspended to ignore motion in the vicinity of the door 66. From 6 AM to 6 PM the door 66 may be subjected to repeated opening and closing, so the rule(s) that normally trigger a response could be suspended to avoid consuming memory. Another example might be moving shadows created by the swaying tree 68. During long summer days (e.g., June to September), shadows that are projected through the swaying tree 68 may trigger unnecessary recording for "uninteresting" events. The set 16 of rules, then, may specify a higher threshold of detected motion during summer months. The rest of the year shadow motion may not be a concern.

The video recorder 10 may interface with other means for sensing events. The video recorder 10 could interface with the door switch and/or the pressure pad (shown collectively as reference numeral 44) to detect motion in the door 66. The set 16 of rules could specify what conditions of the door switch and/or the pressure pad that activate the video recorder 10. The video recorder 10 could also interface with the Heating, Ventilation, and Air Conditioning (HVAC) system 42. When an exhaust fan operates, the exhaust fan may create motion in the tree 68. The set 16 of rules, then, could specify that motion in the tree 68 is ignored while the exhaust fan operates. Suppose, too, a sign hung from a ceiling sways when the exhaust fan operates. The set 16 of rules could specify that when the exhaust fan operates during non-business hours, the motion of the swaying sign is ignored/acceptable. The set 16 of rules may even proactively shut down the exhaust fan to verify that the motion is not caused by an intruder taking advantage of the rule. The set 16 of rules could further specify that motion is ignored when sound frequencies of a lawn mower are detected. The video recorder 10 interfaces with these means for sensing the event and initiates the video data 18 and/or the audio data 22 of the event (e.g., motion in the door 66).

The video recorder 10 may also interface with a security/monitoring service. When the set 16 of rules determines that an event be recorded (e.g., motion in the door 66), the user/administrator may also specify that the set 16 of rules communicate the video data 18 and/or the audio data 22 of the event to a remote location or entity. The interface 52 to the communications network 54 allows the video recorder 10 to transfer the contents of the memory devices to a remote storage location and/or to a security/monitoring service. The video recorder 10 could communicate a video/audio clip of the detected event, and the security/monitoring service could view the video/audio clip and determine an appropriate response. If the available bandwidth permits, the video recorder 10 could send the video data 18 and/or the audio data 22 as a real-time, live feed to the security/monitoring service or other entity. An appropriate response could then be taken based upon this real-time feed. Because the video data 18 and/or the audio data 22 is digital, the video data 18 and/or the audio data 22 could be dynamically scaled to a larger/smaller view while preserving the high-resolution original data.

Figure 3:
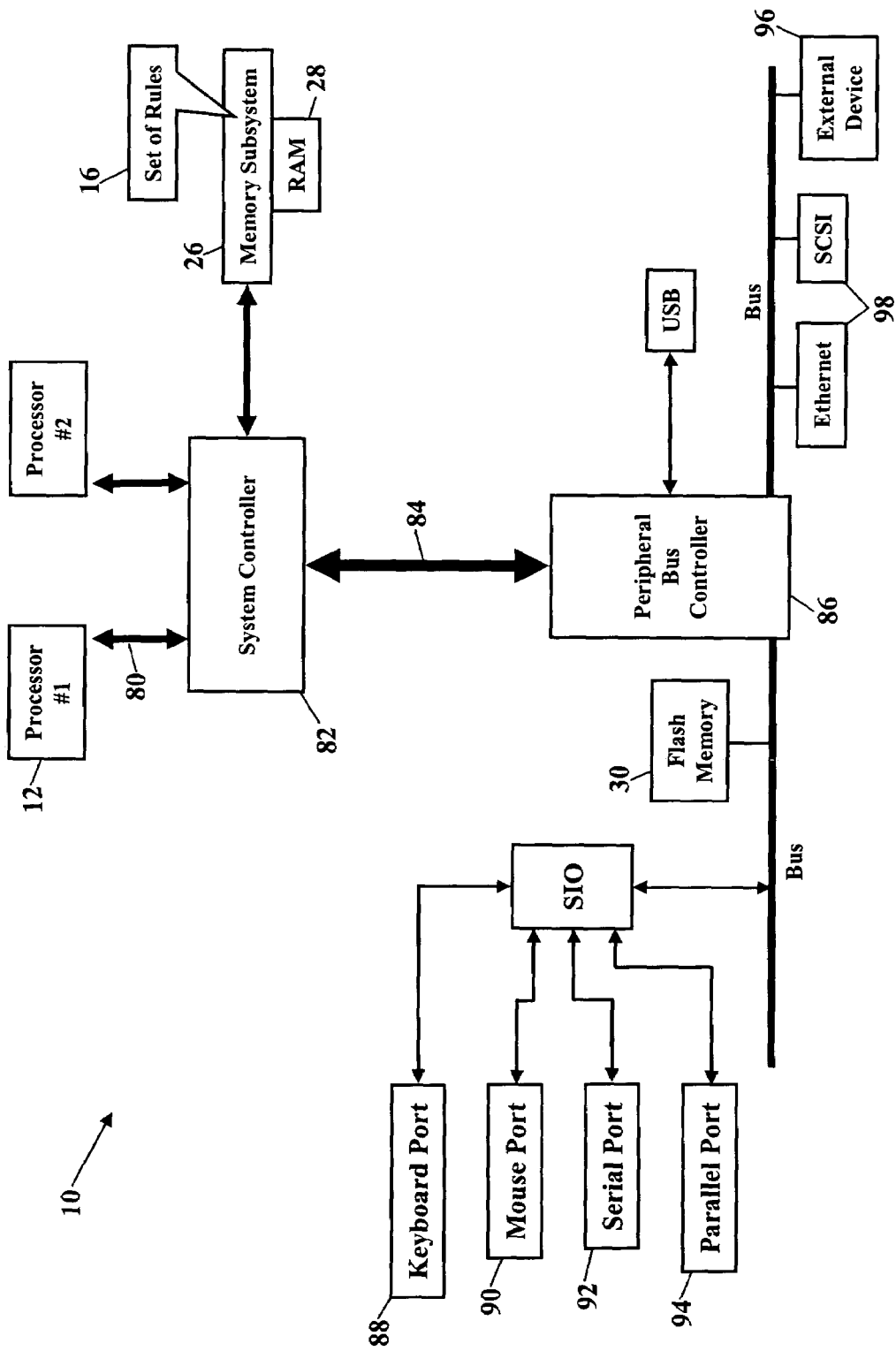
FIG. 3 is a more detailed schematic of the video recorder shown in FIGS. 1 and 2.

FIG. 3 is a more detailed schematic of the video recorder 10. The video recorder 10 includes the one or more processors 12 executing an operating system. The operating system, as is well known, has a set of instructions that control the internal functions of the processors 12 and of other components. A system bus 80 communicates signals, such as data signals, control signals, and address signals, between the processor 12 and a system controller 82 (typically called a "Northbridge"). The system controller 82 provides a bridging function between the one or more processors 12, the memory subsystem 26, and a PCI (Peripheral Controller Interface) bus 84. The PCI bus 84 is controlled by a Peripheral Bus Controller 86. The Peripheral Bus Controller 86 (typically called a "Southbridge") is an integrated circuit that serves as an input/output hub for various peripheral ports. These peripheral ports could include, for example, a keyboard port 88, a mouse port 90, a serial port 92 and/or a parallel port 94 for a video display unit, one or more external device ports 96, and networking ports 98 (such as SCSI or Ethernet). Those of ordinary skill in the art understand that the program, processes, methods, and systems described in this patent are not limited to any particular computer system or computer hardware.

Those of ordinary skill in the art also understand the at least one processor 12 is typically a microprocessor. Advanced Micro Devices, Inc., for example, manufactures a full line of ATHLON ™ microprocessors (ATHLON ™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufacturers also offer microprocessors. Such other manufacturers include Motorola, Inc. (1303 East Algonquin Road, P.O. Box A3309 Schaumburg, Ill.

60196), International Business Machines Corp. (New Orchard Road, Armonk, N.Y. 10504, (914) 499-1900), and Transmeta Corp. (3940 Freedom Circle, Santa Clara, Calif. 95054). Those skilled in the art further understand that the program, processes, methods, and systems described in this patent are not limited to any particular manufacturer's central processor.

The preferred operating system is the UNIX® operating system (UNIX® is a registered trademark of the Open Source Group). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080) and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

The memory devices (shown as reference numerals 26, 28, 30, and/or 32 in FIGS. 1 and 3) may also contain an application program. The application program cooperates with the operating system and with a video display unit (via the serial port 92 and/or the parallel port 94) to provide a Graphical User Interface (GUI). The Graphical User Interface typically includes a combination of signals communicated along the keyboard port 88 and the mouse port 90. The Graphical User Interface provides a convenient visual and/or audible interface with a user of the video recorder 10.

The video recorder 10 may include other componentry. The video recorder 10, for example, may include a video digitizer. This video digitizer would convert analog video data from the at least one camera (shown as reference numeral 20 in FIG. 1) to digital video data. The video recorder 10 may also include video encoding software. This video encoding software is also stored in at least one of the memory devices (shown as reference numerals 26, 28, 30, and/or 32 in FIGS. 1 and 3), and the video encoding software formats the video data transferred from the loop buffer 14. The video data, for example, may be formatted according to an MPEG standard or any other standard. The video recorder 10 may also include encryption software for encrypting the video/audio data before storing in at least one of the memory devices. Encryption may be desirable before remotely storing the video data via the communications network 54.

The set 16 of rules may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the set 16 of rules to be easily disseminated. A computer program product for transferring video and/or audio data from a video recorder to memory comprises the computer-readable medium and the set 16 of rules. The set 16 of rules is stored on the computer-readable medium.

The set 16 of rules may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A video recorder, comprising:
   a processor communicating with memory, the memory storing at least one of i) video data of an event and ii) audio data of the event, the video data comprising a series of picture frames;
   a loop buffer also storing at least one of the audio data and the video data of the event, the loop buffer also storing at least one of time-delayed audio data and time-delayed video data that precedes the event; and
   a set of rules stored in the memory, the set of rules specifying i) at least one of a region of interest and a region of disinterest within a single picture frame, ii) an occurrence that causes transfer of at least one of the time-delayed video data and the time-delayed audio data from the loop buffer to the memory, and iii) a first time and a second time, wherein if the occurrence happens within the at least one of the region of interest and the region of disinterest within a single picture frame at the first time, the set of rules further specifies that at least one of the time-delayed video data and the time-delayed audio data is transferred from the loop buffer to the memory, and if the occurrence happens within the at least one of the region of interest and the region of disinterest within a single picture frame at the second time, the set of rules further specifies that at least one of the time-delayed video data and the time-delayed audio data is not transferred from the loop buffer to the memory.

2. A video recorder according to claim 1, wherein the set of rules further specifies a first bitrate associated with the region of interest and a second bitrate associated with the region of disinterest; and
   wherein if the occurrence happens within the region of interest, the set of rules further specifies that at least one of the time-delayed video data and the time-delayed audio data is transferred from the loop buffer to the memory at the first bitrate, and if the occurrence happens within the region of disinterest, the set of rules further specifies at least one of the time-delayed video data and the time-delayed audio data is transferred from the loop buffer to the memory at the second bitrate.

3. A video recorder according to claim 1, wherein the set of rules further specifies an other occurrence; and
   wherein if the other occurrence is happening when the occurrence happens within the at least one of the region of interest and the region of disinterest within a single picture frame, then the set of rules further specifies that the other occurrence is stopped to verify that the occurrence is caused by the other occurrence.

4. A video recorder according to claim 3, wherein the other occurrence includes operation of a heating, ventilation, and air conditioning system.

5. A video recorder according to claim 1, wherein the memory stores real-time video data of the event and provides the time-delayed video data, the time-delayed video data preceding the occurrence that causes transfer of at least one of the time-delayed video data and the time-delayed audio data from the loop buffer to the memory.

6. A video recorder according to claim 1, wherein the memory stores real-time audio data of the event and provides the time-delayed audio data of the event, the time-delayed audio data preceding the occurrence that causes transfer of at least one of the time-delayed video data and the time-delayed audio data from the loop buffer to the memory.

7. A video recorder according to claim 1, wherein the memory comprises a mass-storage device, the mass storage device storing the video data of the event.

8. A video recorder according to claim 1, wherein the memory comprises an optical storage device.

9. A video recorder according to claim 1, wherein the memory comprises a memory card.

10. A video recorder according to claim 1, wherein the memory comprises a flash memory storage device.

11. A video recorder according to claim 1, wherein the video recorder interfaces with means for sensing the occurrence and initiates video data of the event.

12. A video recorder according to claim 1, wherein the video recorder interfaces with means for sensing the occurrence and initiates audio data of the event.

13. A video recorder according to claim 1, further comprising an interface to a communications network.

14. A video recorder according to claim 1, wherein the set of rules tags the video data with metadata, the metadata providing a description of a rule that caused the video data to be stored in the memory.

15. A video recorder according to claim 1, wherein the set of rules tags the region of interest with metadata, the metadata providing a description of a rule that caused the video data to be stored in the memory.

16. A video recorder according to claim 1, wherein the set of rules tags the region of disinterest with metadata, the metadata providing a description of a rule that caused the video data to be stored in the memory.

17. A video recorder, comprising:
a processor communicating with memory, the memory storing at least one of audio data and video data of an event, the video data comprising a series of picture frames;
a loop buffer also storing at least one of the audio data and the video data of the event, the loop buffer also storing at least one of time-delayed audio data and time-delayed video data that precedes the event; and
a set of rules stored in the memory, the set of rules specifying i) a first occurrence that causes transfer of at least one of the time-delayed video data and the time-delayed audio data from the loop buffer to the memory and ii) a second occurrence, wherein if the first occurrence happens, then the set of rules further specifies determining whether the second occurrence is also happening, and if the second occurrence is also happening, then the set of rules further specifies that at least one of the time-delayed video data and the time-delayed audio data is not transferred from the loop buffer to the memory.

18. A video recorder according to claim 17, further comprising an interface to a communications network, the interface allowing the video recorder to transfer the audio data and the video data to a remote location via the communications network.

19. A video recorder according to claim 17, further comprising a user interface for configuring the video recorder.

20. A video recorder according to claim 17, wherein if the second occurrence is happening when the first occurrence happens, then the set of rules further specifies that the second occurrence is stopped to verify that the first occurrence is caused by the second occurrence.

* * * * *